(12) United States Patent
Mashiki et al.

(10) Patent No.: US 7,152,574 B2
(45) Date of Patent: Dec. 26, 2006

(54) CONTROL APPARATUS FOR INTERNAL COMBUSTION ENGINE

(75) Inventors: Zenichiro Mashiki, Nissin (JP); Naoto Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/185,711

(22) Filed: Jul. 21, 2005

(65) Prior Publication Data

US 2006/0016431 A1    Jan. 26, 2006

(30) Foreign Application Priority Data

Jul. 22, 2004    (JP)    ............................. 2004-214623
Feb. 28, 2005    (JP)    ............................. 2005-054103

(51) Int. Cl.
- F02B 3/00    (2006.01)
- F02B 7/00    (2006.01)
- F03M 43/00    (2006.01)
- F02M 51/00    (2006.01)

(52) U.S. Cl. ...................... 123/299; 123/304; 123/431

(58) Field of Classification Search ................ 123/295, 123/299, 300, 304, 305, 431, 435, 478, 480; 701/104, 105
See application file for complete search history.

(56) References Cited

U.S. PATENT DOCUMENTS

| | | | |
|---|---|---|---|
| 4,463,719 A * | 8/1984 | Pischinger et al. ......... | 123/299 |
| 6,505,603 B1 * | 1/2003 | Schray et al. ............... | 123/299 |
| 6,609,493 B1 * | 8/2003 | Yamaguchi et al. ........ | 123/299 |
| 6,619,255 B1 * | 9/2003 | Urushihara et al. ......... | 123/299 |
| 6,636,797 B1 * | 10/2003 | Yoshizawa et al. ......... | 701/104 |
| 6,659,068 B1 * | 12/2003 | Urushihara et al. ......... | 123/299 |
| 6,981,487 B1 * | 1/2006 | Ohtani ........................ | 123/299 |
| 2002/0078918 A1 * | 6/2002 | Ancimer et al. ............ | 123/304 |
| 2003/0230281 A1 | 12/2003 | Hoshino ................ | 123/406.29 |
| 2005/0211219 A1 * | 9/2005 | Strom et al. ................ | 123/299 |

FOREIGN PATENT DOCUMENTS

| | | |
|---|---|---|
| JP | A 10-159642 | 6/1998 |
| JP | A 10-318027 | 12/1998 |
| JP | A 11-229951 | 8/1999 |
| JP | A 2000-145516 | 5/2000 |
| JP | A 2002-227697 | 8/2002 |

* cited by examiner

Primary Examiner—Willis R. Wolfe, Jr.
(74) Attorney, Agent, or Firm—Oliff & Berridge PLC

(57) ABSTRACT

An engine ECU executes a program including the step of calculating an injection time Astart from the engine speed and load factor when arriving at the injection calculation timing of a cylinder located in the proximity of a knock sensor, the step of calculating an injection period TAU, the step of calculating an injection end time Aend, the step of shortening the injection time of an in-cylinder injector when the injection time Astart or injection end time Aend is within a KCS gate, and the step of calculating the port injection period so as to inject the insufficient injection quantity from an intake manifold injector when the required injection quantity will be insufficient as a result of shortening the injection period of the in-cylinder injector.

12 Claims, 9 Drawing Sheets

INJECTION TIME Astart     ADVANCED

INJECTION PERIOD TAU     NOT CHANGED

INJECTION TIME Astart    NOT CHANGED

INJECTION PERIOD TAU    SHORTENED

CONTROL APPARATUS FOR INTERNAL COMBUSTION ENGINE

This nonprovisional application is based on Japanese Patent Applications Nos. 2004-214623 and 2005-054103 filed with the Japan Patent Office on Jul. 22, 2004 and Feb. 28, 2005, respectively, the entire contents of which are hereby incorporated by reference.

BACKGROUND OF THE INVENTION

1. Field of the Invention

The present invention relates to a control apparatus for an internal combustion engine including first fuel injection means (in-cylinder injector) for injecting fuel into a cylinder and second fuel injection means (intake manifold injector) for injecting fuel towards an intake manifold or intake port. Particularly, the present invention relates to an apparatus for controlling the internal combustion engine such that a knock sensor in a KCS (Knock Control System) does not erroneously sense vibration other than knocking.

2. Description of the Background Art

An internal combustion engine is well-known, including a first fuel injection valve (intake manifold injector in the background art) for injecting fuel in the intake manifold of the engine and a second fuel injector valve (in-cylinder injector in the background art) for constantly injecting fuel into the engine combustion chamber, wherein fuel injection from the first fuel injection valve is inhibited when the engine load is lower than a predetermined load setting, and fuel is injected from the first fuel injection valve when the engine load is higher than the predetermined load setting. The overall injection quantity that is the total of the fuel injected from the two fuel injection valves in this internal combustion engine is determined in advance as the function of the engine load. The overall injection quantity is increased as the engine load becomes higher.

The second fuel injection valve (in-cylinder injector) is mounted so as to directly open towards the combustion chamber of the internal combustion engine, and directly injects the fuel pressurized by the fuel pump into the cylinder. The second fuel injection valve must set the fuel pressure 20–50 times higher than that of the first fuel injection valve. The second fuel injection valve employs a robust spring to achieve such a high oil pressure and a high voltage circuit that can achieve an intensive electromagnetic force for high response. The second fuel injection valve is mounted so as to directly protrude into the combustion chamber, and is used under the environmental condition of high pressure, high heat, and intensive vibration by the combustion. Therefore, the second fuel injection valve is apt to exhibit function degradation and occurrence of an abnormal event due to carbon clogging and the like, as compared to the fuel injection valve conventionally and widely employed in manifold injection type internal combustion engines. Degradation in the performance and occurrence of an abnormal event at the fuel injection valve will prohibit proper operation of the internal combustion engine, resulting in the possibility of posing problems such as power degradation and increase in the emission of harmful gas components.

Japanese Patent Laying-Open No. 10-318027 discloses a fuel injection valve abnormality detecting device for an internal combustion engine including such an in-cylinder injector. This fuel injection valve abnormality detecting device includes, in the fuel injection internal combustion engine, signal detection means (knock sensor) for detecting a signal reflecting the vibrating state of the internal combustion engine, and means for determining abnormality at the fuel injection valve by obtaining a signal related to the opening/closure of the fuel injection valve through the signal detection means.

In accordance with this fuel injection valve abnormality detecting device for an internal combustion engine, an abnormal event at the in-cylinder injector can be detected through the vibrating state of the internal combustion engine detected by a knock sensor. In other words, vibration in connection with an operation of the in-cylinder injector can be sensed by a knock sensor, and an abnormal event at the in-cylinder injector can be detected based on the sensed result.

Japanese Patent Laying-Open No. 11-229951 discloses a knocking control device that can properly conduct knocking determination using a knocking sensor, impervious to variable valve timing (VVT) control, in a multiple-cylinder internal combustion engine with a VVT control device. This knocking control device is provided at a multiple-cylinder internal combustion engine with a variable valve timing control device for controlling the opening/closing timing of at least one of the intake valve and exhaust valve of each cylinder in the internal combustion engine according to the internal combustion engine operation state. A detection signal from the knock sensor that detects the mechanical vibration of the internal combustion engine is fetched during a predetermined knock determination period in the detonation stroke of each cylinder in the internal combustion engine. Determination is made whether knocking has occurred or not in the internal combustion engine based on the fetched detection signal. Knocking control is effected by adjusting the ignition timing of the internal combustion engine based on the determination result. The knocking control device includes knock determination period setting means for setting a knock determination period such that the closing timing of the intake valve or exhaust valve does not overlap with the knock determination period, based on the opening/closing timing of the intake valve or exhaust valve under control of the variable valve timing control device.

According to this knocking control device of an internal combustion engine with a VVT control device, a knock signal is fetched from a knock sensor, and the knock determination period to carry out knocking determination is set so as to avoid overlapping with at least the valve closing timing, based on the timing of the intake valve or exhaust valve under control of VVT. A knock signal including the seating noise of the intake/exhaust valve is fetched during the knock determination period to prevent erroneous determination of knocking for accurate execution of knocking control.

Japanese Patent Laying-Open No. 10-318027 teaches that vibration in connection with an operation of the in-cylinder injector is sensed by a knock sensor. Japanese Patent Laying-Open No. 11-229951 teaches that control is effected such that the knock determination period does not overlap with the closing timing of the intake valve and exhaust valve. Thus, it is difficult to sense knocking at high accuracy by a knock sensor when vibration in connection with the operation of the in-cylinder injector overlaps with the knock determination period in an engine with an in-cylinder injector.

Although control can be effected such that the closing timing of the intake valve and/or exhaust valve does not overlap with the knock determination period through the VVT based on the teachings of the patent documents set forth above, control cannot be effected such that the vibration in connection with an operation of the in-cylinder injector does not overlap with the knock determination period. If the injection period of the in-cylinder injector is shortened, the required fuel injection quantity may not be satisfied. There is a possibility of having difficulty in ensuring the engine performance.

SUMMARY OF THE INVENTION

In view of the foregoing, an object of the present invention is to provide, for an internal combustion engine including a first fuel injection mechanism for injecting fuel into a cylinder and a second fuel injection mechanism for injecting fuel into an intake manifold, both partaking in fuel injection, a control apparatus that can have knocking sensed at high accuracy by a knock sensor, preventing the knock sensor from sensing vibration in connection with an operation of the first fuel injection mechanism without degrading the performance of the internal combustion engine.

According to an aspect of the present invention, a control apparatus includes a first fuel injection mechanism for injecting fuel into a cylinder, and a second fuel injection mechanism for injecting fuel into an intake manifold. The control apparatus operates the fuel injection mechanism based on a fuel injection timing and fuel injection period, and controls the internal combustion engine so as to carry out knocking determination based on an output signal from a knock sensor in a knock determination period. The control apparatus includes a determination unit for determining whether a noise generated by an operation of the first fuel injection mechanism overlaps with an output signal of a knock sensor in the knock determination period, a modification unit for modifying at least one of the fuel injection timing and fuel injection period of the first fuel injection mechanism so as to avoid an event of the noise generated by the operation of the first fuel injection mechanism overlapping with the output signal of the knock sensor in the knock determination period based on a determination result by the determination unit, and a control unit for controlling the second fuel injection mechanism so as to compensate for insufficiency when a required fuel injection quantity will be insufficient under the modified fuel injection state.

In accordance with the present invention, a noise generated by an operation of the first fuel injection mechanism (for example, in-cylinder injector) will not be entered during the knock determination period (knock detection gate). Therefore, erroneous detection of knocking corresponding to the case where knocking, though not actually occurring, will be falsely detected can be suppressed. Furthermore, even in the case where the required fuel will be insufficient through the modification of at least one of the fuel injection timing and fuel injection period of the in-cylinder injector, the insufficiency can be compensated for by the second fuel injection mechanism (for example, intake manifold injector) to allow fuel supply that will satisfy the required fuel injection quantity. Therefore, the internal combustion engine power will not be degraded. Thus, for an internal combustion engine including an in-cylinder injector and an intake manifold injector, both partaking in fuel injection, a control apparatus that can have knocking sensed at high accuracy by a knock sensor, preventing the knock sensor from sensing vibration in connection with an operation of the in-cylinder injector without degrading the performance of the internal combustion engine can be provided.

Preferably, the modification unit conducts modification so as to shorten the fuel injection period. The control apparatus further includes a fuel pressure control unit for controlling the fuel pressure such that the required fuel injection quantity is supplied at the modified fuel injection period.

Even if the fuel injection period of the in-cylinder injector is modified to a shorter period in the present invention, the fuel pressure can be increased to allow fuel supply satisfying the required fuel injection quantity. Therefore, the internal combustion engine power will not be degraded.

According to another aspect of the present invention, a control apparatus includes a first fuel injection mechanism for injecting fuel into a cylinder and a second fuel injection mechanism for injecting fuel into an intake manifold. The control apparatus operates the fuel injection mechanism based on a fuel injection timing and fuel injection period, and controls an internal combustion engine such that knock determination is carried out based on an output signal from a knock sensor in a knock determination period. The control apparatus includes a determination unit for determining whether a noise generated by at least an operation of the first fuel injection mechanism and an operation of a high pressure fuel system that supplies fuel to the first fuel injection mechanism overlaps with the output signal from the knock sensor in the knock determination period, a modification unit for modifying the fuel pressure of the high pressure fuel system so as to avoid the event of the noise generated by the operation overlapping with the output signal of the knock sensor in the knock determination period based on the determination result by the determination unit, and a control unit for controlling the second fuel injection mechanism so as to compensate for insufficiency when a required fuel injection quantity will be insufficient under the modified fuel pressure.

In accordance with the present invention, the fuel pressure of the high pressure fuel system that supplies fuel to the first fuel injection mechanism (for example, in-cylinder injector) is modified (lowered) to reduce the level of noise generated by an operation of the first fuel injection mechanism or an operation of the high pressure fuel system that supplies fuel to the first fuel injection mechanism. Therefore, even if the noise will be entered during the knock determination period (knock detection gate), the knock sensor will not sense this noise since the level of this noise is reduced. Therefore, erroneous detection of knocking corresponding to the case where knocking, though not actually occurring, will be falsely detected can be suppressed. Even in the case where the required fuel will become insufficient by the modification (lowering) of the fuel pressure, insufficiency can be compensated for by the second fuel injection mechanism (for example, intake manifold injector) to supply fuel satisfying the required fuel injection quantity. Therefore, the internal combustion engine power will not be degraded. Thus, for an internal combustion engine including an in-cylinder injector and an intake manifold injector, both partaking in fuel injection, a control apparatus that can have knocking sensed at high accuracy by a knock sensor, preventing the knock sensor from sensing vibration in connection with an operation of the in-cylinder injector and/or high pressure fuel system without degrading the performance of the internal combustion engine, can be provided.

Preferably, the modification unit conducts modification so as to lower the fuel pressure. The control apparatus further includes an injection period control unit for controlling the fuel injection period such that the required fuel injection quantity can be supplied at the reduced fuel pressure.

In accordance with the present invention, the fuel pressure of the high pressure fuel system can be lowered to reduce the level of the noise generated by an operation of the in-cylinder injector or an operation of a high pressure pump (electromagnetic spill valve) that supplies fuel to the in-cylinder injector, so as to prevent the knock sensor from sensing such noise. In such a case where the fuel pressure is lowered, control is effected such that the fuel injection period of the in-cylinder injector is increased by the fuel injection period control unit to allow injection of the required fuel. In the case where the fuel injection quantity is still insufficient, the insufficiency is to be provided from the intake manifold injector.

Further preferably, the injection period control unit effects control such that the fuel injection period is lengthened so as to set the end of the fuel injection period later than the end of the knock determination period.

By lowering the fuel pressure of the high pressure fuel system that supplies fuel to the in-cylinder injector in the present invention, the fuel injection period is lengthened to inject the same quantity of fuel from the in-cylinder injector. The end of the fuel injection period (the closing timing of the needle valve of the in-cylinder injector, corresponding to the noise generated timing) is set to become later than the end of the knock determination period. Accordingly, lowering the fuel pressure of the high pressure fuel system allows the level of the noise per se to become smaller, and the closing timing of the needle valve corresponding to the noise generated timing can be set outside the knock determination period. This ensures that vibration in connection with an operation of the in-cylinder injector and/or high pressure fuel system is not sensed by the knock sensor. Thus, knocking can be sensed at high accuracy by the knock sensor.

Further preferably, the first fuel injection mechanism is an in-cylinder injector, and the second fuel injection mechanism is an intake manifold injector.

Thus, for an internal combustion engine including an in-cylinder injector identified as the first fuel injection mechanism and an intake manifold injector identified as the second fuel injection mechanism, provided separately and both partaking in fuel injection, a control apparatus that can have knocking sensed at high accuracy by a knock sensor, preventing the knock sensor from sensing vibration in connection with an operation of the in-cylinder injector without degrading the performance of the internal combustion engine, can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
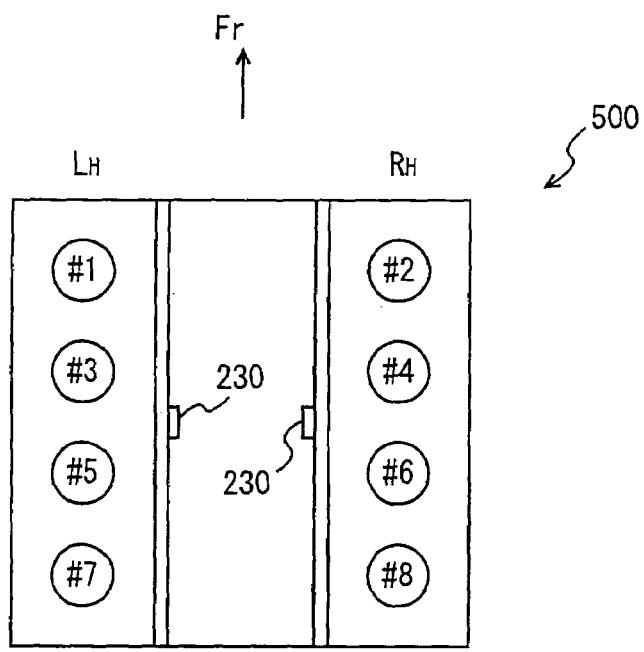
FIG. 1 represents an engine cylinder arrangement under control of an engine ECU identified as a control apparatus according to a first embodiment of the present invention.

Embodiments of the present invention will be described hereinafter with reference to the drawings. The same components have the same reference characters allotted. Their designation and function are also identical. Therefore, detailed description thereof will not be repeated.

First Embodiment

An engine system including an engine ECU (Electronic Control Unit) identified as a control apparatus for an internal combustion engine according to a first embodiment of the present invention will be described hereinafter. FIG. 1 represents the cylinder arrangement of an engine 500 under control of the engine ECU identified as the control apparatus of the present embodiment. As shown in FIG. 1, it is assumed that engine 500 is a reciprocating engine of 4 cycles, which is a V-8 gasoline engine including 8 cylinders. Although the present embodiment will be described based on such a V type 8-cylinder internal combustion engine, it is to be understood that the present invention is not limited thereto.

At the left bank in the V bank, cylinders #1, #3, #5 and #7 are arranged. At the right side bank, cylinders #2, #4, #6 and #8 are arranged. A knock sensor 230 is located between cylinder #3 and cylinder #5, and also between cylinder #4 and cylinder #6.

Figure 2:
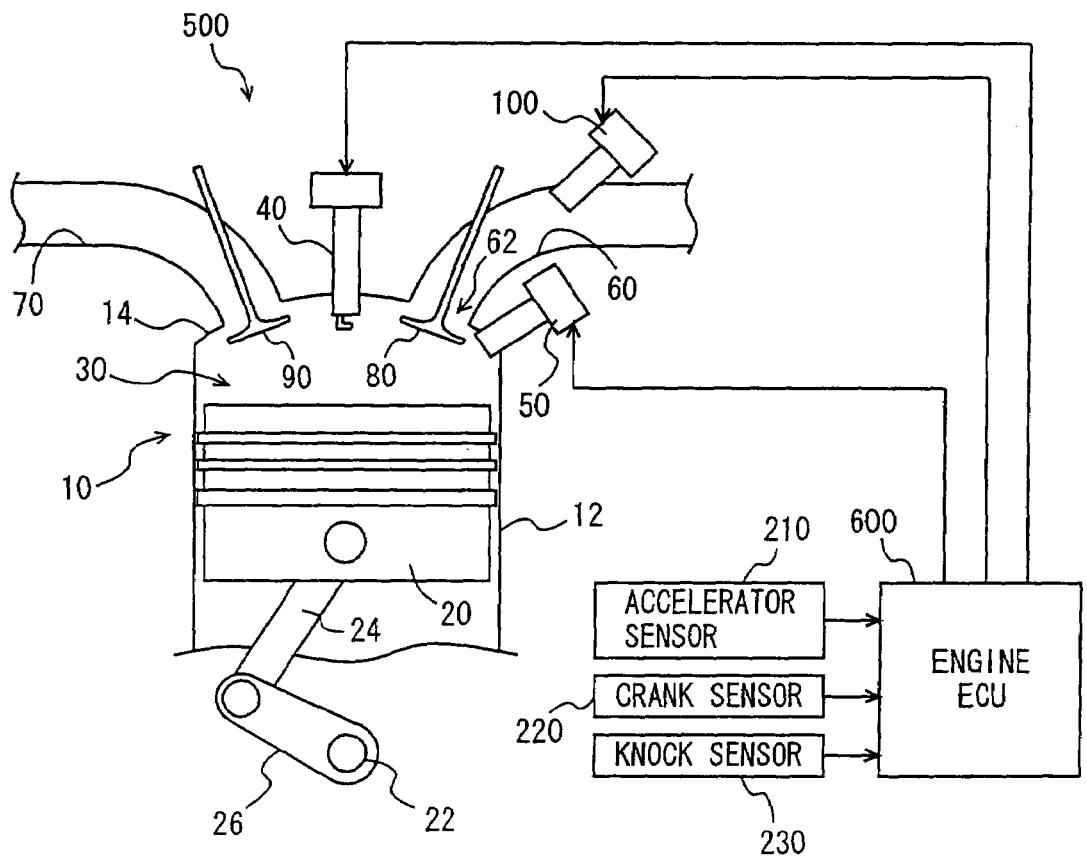
FIG. 2 represents a configuration of the engine under control of the engine ECU identified as a control apparatus according to the first embodiment of the present invention.

One of the 8 cylinders in FIG. 1 will be described as a representative thereof with reference to FIG. 2. Engine 500 is formed of a cylinder 10 including a cylinder block 12 and a cylinder head 14 connected above cylinder block 12, and a piston 20 that moves back and forth in cylinder 10. Piston 20 has a connecting rod 24 and a crank arm 26 connected to a crankshaft 22 that is the output shaft of engine 500. The reciprocating movement of piston 20 is converted into the rotation of crankshaft 22 by means of connecting rod 24. In cylinder 10, the inner wall of cylinder block 12 and cylinder head 14 and the top plane of piston 20 constitute the partition for a combustion chamber 30 in which air-fuel mixture is burned.

Cylinder head 14 is provided with a spark plug 40 protruding into combustion chamber 30 to ignite the air-fuel mixture, and an in-cylinder injector 50 injecting fuel into combustion chamber 30. Combustion chamber 30 communicates with an intake manifold 60 and an exhaust manifold 70 via an intake valve 80 and an exhaust valve 90, respectively. Intake manifold 60 is provided with an intake port 60 that is the communicating section between intake manifold 60 and combustion chamber 30, and/or an intake manifold injector 100 injecting fuel to intake manifold 60. Although an internal combustion engine with two separate injectors will be described in the present embodiment, it is to be understood that the present invention is not limited to such an internal combustion engine. For example, an internal combustion engine with one injector having an in-cylinder injection function and intake manifold injection function together may be employed.

Engine 500 also includes an accelerator sensor 210, a crank sensor 220, and a knock sensor 230. Knock sensor 200 is provided at two sites of engine 500, as shown in FIG. 1.

Accelerator sensor 210 provided in the proximity of an accelerator pedal (not shown) detects the throttle opening (press-down degree). The detected value is appropriately subjected to A/D conversion at an engine ECU 600 to be provided to a microcomputer in engine ECU 600.

Crank sensor 220 is formed of a rotor attached to crankshaft 22 of engine 500 and an electromagnetic pickup, located in the proximity of the rotor, for detecting the passage of a projection provided at the outer circumference of the rotor. The sensor detects the rotation phase (crank angle) of crankshaft 22 and the rotation speed of engine 500. The output of crank sensor 220 has its waveform appropriately shaped by an engine ECU 500, and then provided to a microcomputer in engine ECU 500 as a pulse signal (NE pulse) corresponding to the rotation speed of crankshaft 22.

Knock sensor 230 is located at cylinder block 12 of engine 500. Knock sensor 230 detects vibration including knocking generated at engine 500. The output of knock sensor 230 is provided to the microcomputer in engine ECU 600 as a knock signal corresponding to the vibration level.

Engine ECU 600 includes, in addition to a microcomputer, an A/D converter, a wave shaping circuit, a memory to temporarily store various data and calculated results, and a driver (driving circuit) to drive various actuators and the like. Based on the engine operation state identified through detection signals and the like from various sensors, control is executed on the ignition timing of spark plug 40 as well as on the fuel injection from in-cylinder injector 50 and intake manifold injector 100.

Engine ECU 600 operates as a knock control system (KCS) to avoid generation of knocking at engine 500. Avoiding knocking through a knock control system will be described in detail hereinafter.

Engine ECU 600 takes the period during which knocking may be generated at engine 500, i.e., the period in the vicinity of the compression top dead center (compression stroke) of each cylinder and after the termination of the ignition timing, as the knock determination period (gate). Engine ECU 600 identifies vibration unique to knocking based on the detection signal from knock sensor 230 corresponding to the vibration at cylinder block 12 during the knock determination period. Specifically, during the knock determination period, the number of times the output peak value from knock sensor 230 exceeds a criterion value is counted, and determination is made that vibration unique to knocking is occurring when the counted number exceeds a predetermined value. Based on such a determination, knocking can be detected.

Upon detection of knocking set forth above, engine ECU 600 corrects the ignition timing by retarding to avoid knocking. Specifically, the ignition timing is controlled towards spark advance by increasing the retarded amount of the ignition timing for each knocking detection and reducing this retarded amount when knocking is not detected. By such control of the ignition timing, the ignition timing is adjusted to the knocking limit to avoid knocking while increasing the power of engine 500 as high as possible. The retarded amount of the ignition timing has its upper limit guarded by a preset guard value G such that the ignition timing is not retarded excessively at the time of frequent occurrence of knocking.

In addition to avoid knocking in the vicinity of the ignition timing set forth above, engine ECU 600 executes switching control of fuel injection between in-cylinder injector 500 and intake manifold injector 100. Such switching control is conducted based on the engine operation state such as the engine speed and engine load, and is adapted to select the fuel injection manner suitable for the current engine operation state. In every case of fuel injection, regardless of the selection of whether to be conducted by in-cylinder injector 50, by intake manifold injector 100, or by both thereof, the fuel injection timing and/or fuel injection quantity is appropriately controlled to suit the engine operation state.

In the case where fuel injection is conducted by in-cylinder injector 50 during the compression stroke, the closing timing of the needle valve of in-cylinder injector 50 may be retarded so as to approximate the compression top dead center, depending upon the engine operation state, and enter the gate of the knock control system (KCS). Since in-cylinder injector 50 is provided in the neighborhood of knock sensor 230 located at cylinder block 12 with cylinder head 14 for in-cylinder injection, knock sensor 230 will be affected by the vibration in connection with the closing needle valve (seating). If the closing timing of the needle valve enters the gate, knock sensor 230 will output a signal corresponding to the vibration in connection with the closing needle valve (seating) as a closing valve noise. If this closing valve noise is of a level that exceeds the criterion value, a false count will be added even though knocking has not actually occurred, and the count of the output peak value from knock sensor 230 exceeding the determination criterion value will become greater than the predetermined number of times, resulting in erroneous determination of knocking generation. Such an erroneous determination will cause increase of the retarded amount of the ignition timing, although knocking has not occurred, and the ignition timing will be retarded erroneously corresponding to the retarded amount.

In view of the foregoing, the present embodiment is directed to modifying (shifting) the timing of fuel injection by in-cylinder injector 50 when the closing timing of the needle valve to suppress retardation of the ignition timing enters the gate, whereby the closing timing of the needle valve is set outside the gate. In such a case, the fuel injection timing and duel injection period suitable to the engine operation state may be modified. When this modification will induce performance deterioration in the engine operation such that the potential of the internal combustion engine cannot be output sufficiently, compensating for the required fuel injection quantity through intake manifold injector 100 can be considered as one approach.

Figure 3:
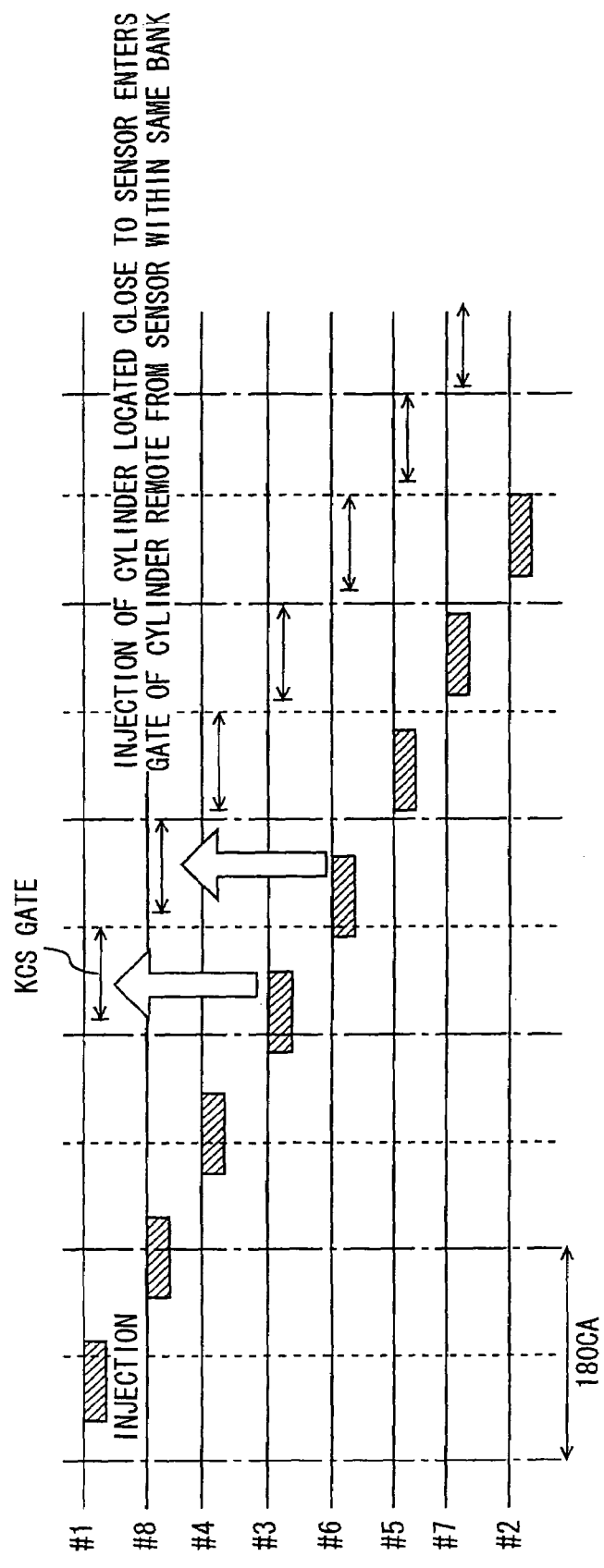
FIG. 3 represents the relationship between a KCS gate and a fuel injection period by an in-cylinder injector.

FIG. 3 represents the relationship between the KCS gate and the fuel injection period by the in-cylinder injector.

The horizontal axis represents the crank angle. The vertical axis represents the fuel injection period by in-cylinder injector 50 at each of cylinders #1, #8, #4, #3, #6, #5, #7, and #2 and the KCS gate. For example, when fuel injection is executed by in-cylinder injector 50 at cylinder #3, the injection end timing of in-cylinder injector 50 (needle valve closing (seating) timing) is present in the KCS gate of cylinder #1. This indicates that injection of a cylinder located close to knock sensor 230 enters the KCS gate of a cylinder located remote from knock sensor 230 within the same bank.

Figure 4:
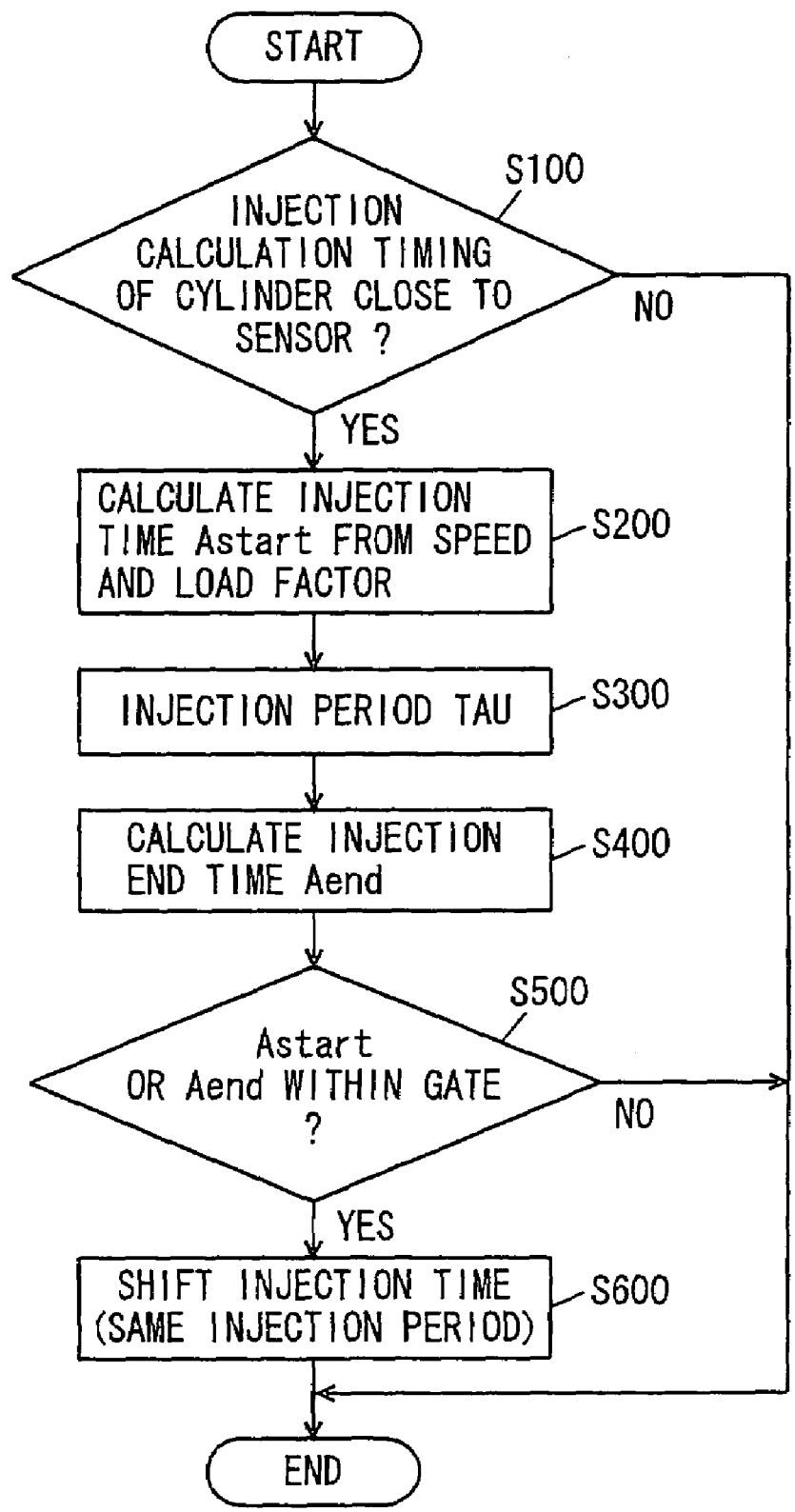
FIG. 4 is a flow chart of a control structure of a program executed by the engine ECU identified as the control apparatus according to the first embodiment of the present invention.

If the valve closing timing through in-cylinder injector 50 of one cylinder enters the KCS gate of another cylinder as shown in FIG. 3, knock sensor 230 will erroneously detect an output peak value. The program shown in FIG. 4 is executed to avoid such an event at engine ECU 600 identified as a control apparatus according to the present embodiment.

The control structure of the program executed by engine ECU 600 will be described hereinafter with reference to FIG. 4.

At step (hereinafter, step abbreviated as "S") 100, engine ECU 600 determines whether it is now the time to calculate the injection of a cylinder located in the proximity of knock sensor 230. This calculation timing is in synchronism with the crank angle. The vicinity of BTDC 540 degrees is the timing to set the injection control designation. In the case where fuel is to be actually injected in the vicinity of BTDC 270 degrees, determination is made of the arrival of the calculation timing when reaching the vicinity of BTDC 540 degrees. When determination is made of the injection calculation timing of a cylinder located in the proximity of knock sensor 230 (YES at S100), control proceeds to S200, otherwise (NO at S100), the process ends.

At S200, the injection time Astart is calculated based on the engine speed and load factor. At S300, engine ECU 600 calculates the injection period TAU. The injection quantity of in-cylinder injector 50 is calculated through injection period TAU based on the DI ratio r, maximum injection quantity EQMAX, load factor, strike feedback factor, learning value of in-cylinder injector 50, and the conversion factor into an injection quantity corresponding to the fuel pressure, and the like.

At S400, engine ECU 600 calculates the injection end time Aend. At this stage, Aend=Astart+TAU.

At S500, engine ECU 600 determines whether injection time Astart or injection end time Aend is within the KCS gate. When injection time Astart or injection end time Aend is within the KCS gate (YES at S500), control proceeds to S600, otherwise (NO at S500), the process ends.

At S600, engine ECU 600 shifts the injection time. However, the injection period TAU is not changed.

An operation of effecting control such that the valve closing (seating) noise of in-cylinder injector 50 does not enter the KCS gate in an engine system with engine ECU 600 of the present invention will be described based on the structure and flow chart set forth above.

Arriving at the injection calculation timing of a cylinder located in the proximity of knock sensor 230 (YES at S100), injection time Astart is calculated based on the engine speed and load factor of engine 500 (S200). Injection period TAU is calculated based on the load factor and the like. The injection end time Aend is calculated from injection time Astart and injection period TAU (S400).

Figure 5:
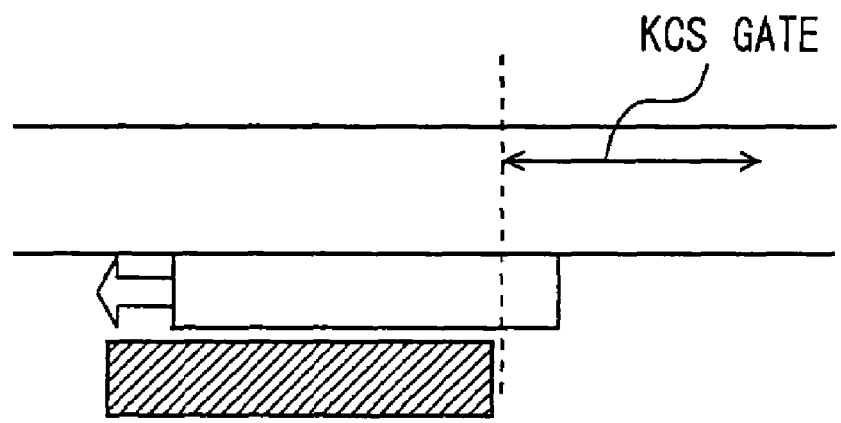
FIG. 5 represents an example of avoiding overlapping between the KCS gate and the fuel injection period of the in-cylinder injector by the engine ECU identified as the control apparatus according to the first embodiment of the present invention.

When injection end time Aend overlaps with the KCS gate as shown in FIG. 5 (YES at S500), in-cylinder injector 50 is controlled such that the injection time of in-cylinder injector 50 is shifted. Although the injection time Astart is advanced as shown in FIG. 5, injection period TAU is not modified. Thus, control is effected such that injection end time Aend does not overlap with the KCS gate, as shown in FIG. 5.

By executing control through the engine ECU of the present embodiment as set forth above, the event of the injection period of the in-cylinder injector for a cylinder located close to the sensor in the same bank entering the KCS gate of a cylinder located remote from the knock sensor can be prevented. As a result, knocking can be sensed at high accuracy through the knock sensor by preventing the knock sensor from sensing vibration in connection with an operation of the in-cylinder injector without degradating the engine performance.

Second Embodiment

A control apparatus for an internal combustion engine according to a second embodiment of the present invention will be described hereinafter. The engine system of the present embodiment is similar to the engine system of the first embodiment set forth above (FIGS. 1 and 2). Therefore, details of the description thereof will not be repeated here.

Figure 6:
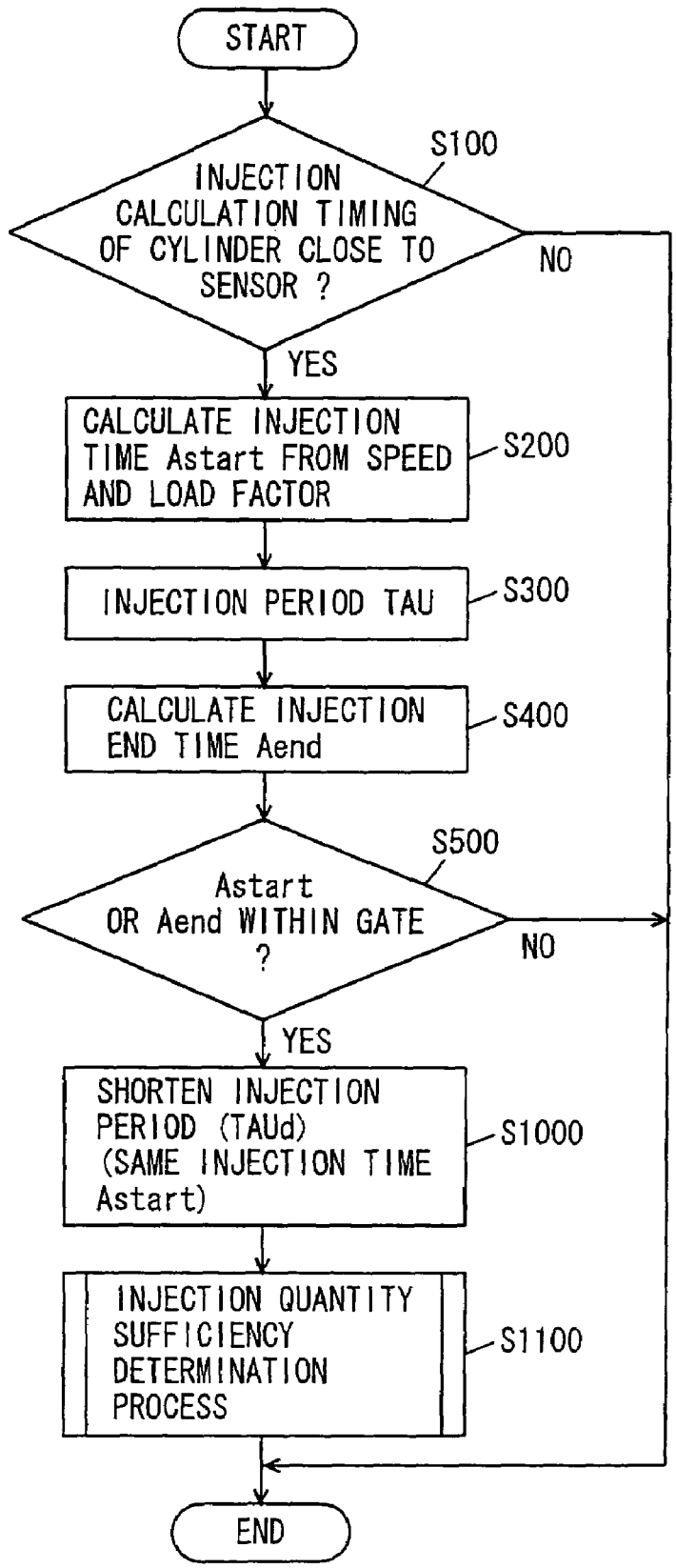
FIG. 6 is a flow chart (first flow chart) of a control structure of a program executed by an engine ECU identified as a control apparatus according to a second embodiment of the present invention.

A control structure of a program executed by engine ECU 600 according to the second embodiment will be described with reference to FIG. 6. In the flow chart of FIG. 6, procedures identical to those in the process of the flow chart of FIG. 4 have the same step number denoted. Their specific contents are identical. Therefore, detailed descriptions thereof will not be repeated.

At S1000, engine ECU 600 shortens the injection period to TAUd. It is assumed that injection time Astart is not changed. At S1100, engine ECU 600 executes an engine quantity sufficiency determination process.

Figure 7:
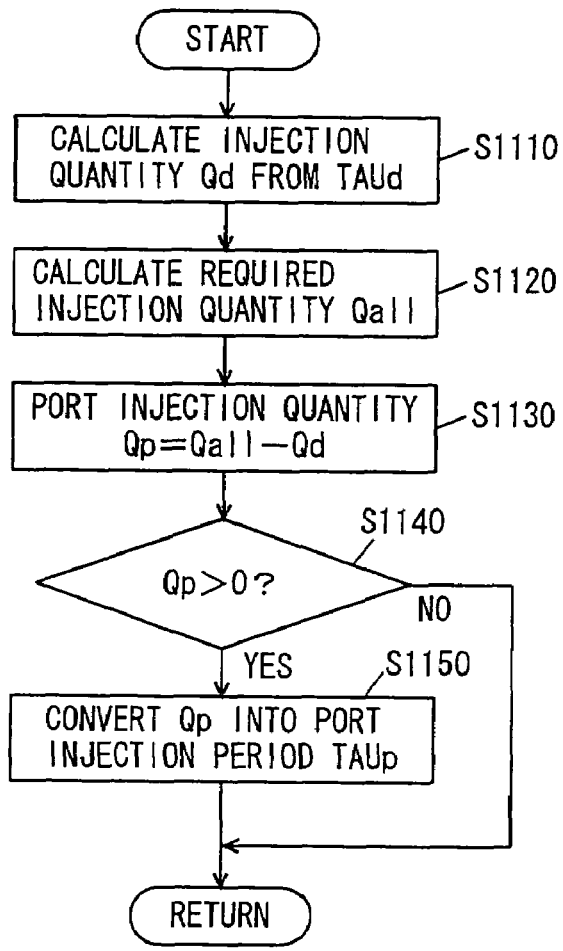
FIG. 7 is a flow chart (second flow chart) of a control structure of the program executed by the engine ECU identified as the control apparatus according to the second embodiment of the present invention.

The injection quantity sufficiency determination process of S1100 of FIG. 6 will be described with reference to FIG. 7.

At S1110, engine ECU 600 calculates an injection quantity Qd from in-cylinder injector 50 based on the shortened injection period TAUd. At S1120, engine ECU 600 calculates the required injection quantity Qall based on the engine speed, load factor, and the like.

At S1130, engine ECU 600 calculates the port injection quantity Qp that is the injection quantity from intake manifold injector 100 by Qp=Qall−Qd. At S1140, engine ECU 600 determines whether the value of port injection quantity Qp is positive or not. When the value of port injection quantity Qp is positive (YES at S1140), control proceeds to S1150, otherwise (NO at S1140), the process ends. Although determination is based on whether Qp is positive or not in the procedure of S1140, determination can be made based on whether Qp is greater than the lowest injection quantity of intake manifold injector 100 instead.

At S1150, engine ECU 600 conducts calculation to convert port injection quantity Qp into a port injection period TAUp.

An operation of the engine system under control of the engine ECU of the present embodiment will be described hereinafter based on the structure and flow chart set forth above.

Figure 8:
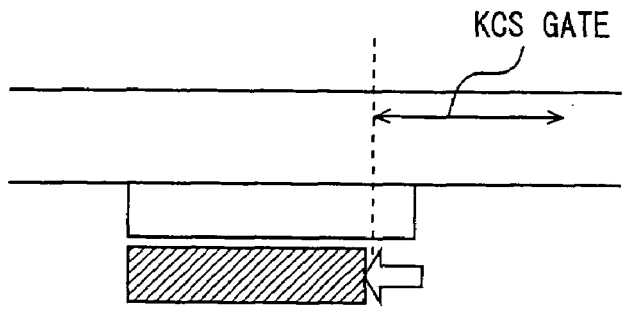
FIG. 8 represents an example of avoiding overlapping between the KCS gate and the fuel injection period of the in-cylinder injector by the engine ECU identified as the control apparatus according to the second embodiment of the present invention.

When determination is made that the injection time Astart or injection end time Aend of in-cylinder injector 50 is within the KCS gate (YES at S500), the injection period of in-cylinder injector 50 is shortened to TAUd. At this stage, injection time Astart is not modified, and injection period TAU is shortened to TAUd, as shown in FIG. 8. Accordingly, the injection period of in-cylinder injector 50 will not overlap with the KCS gate, as shown in FIG. 8.

Since the injection period of in-cylinder injector 50 is shortened from TAU to TAUd, there is the possibility of insufficient fuel supply with respect to engine 500. Such an event is determined by an injection quantity sufficiency determination process (S1100), and the insufficiency is compensated for by injecting fuel from intake manifold injector 100 when the injection quantity is insufficient.

Injection quantity Qd of in-cylinder injector 50 is calculated from the shortened injection period TAUd of in-cylinder injector 50 (S1110). The required injection quantity Qall that is the overall fuel injection quantity to be supplied to engine 500 is calculated based on the engine speed and load factor of engine 500 (S1120). Fuel injection quantity Qd from in-cylinder injector 50 is subtracted from required injection quantity Qall to calculate port injection quantity Qp. When port injection quantity Qp is positive (YES at S1140), determination is made that the required injection quantity is not sufficient as a result of reducing the injection period of in-cylinder injector 50. In order to inject fuel from intake manifold injector 100, port injection quantity Qp is calculated into port injection period TAUp (S1150).

In accordance with the engine ECU of the present embodiment for in an engine including an in-cylinder injector and an intake manifold injector, the fuel injection period is shortened when a noise generated by an operation of in-cylinder injector enters the KCS gate such that the injection fuel period of the in-cylinder injector does not overlap with the KCS gate. In the case where the modified fuel injection quantity from the in-cylinder injector is insufficient with respect to the required fuel injection quantity, intake manifold injector is controlled so as to compensate for the insufficiency. Both the in-cylinder injector and intake manifold injector partake in fuel injection to avoid degradation of the performance of the internal combustion engine. Knocking can be sensed at high accuracy through the knock sensor by preventing the knock sensor from sensing the vibration in connection with an operation of the in-cylinder injector.

Third Embodiment

A control apparatus for an internal combustion engine according to a third embodiment of the present invention will be described hereinafter. The control apparatus for an internal combustion engine of the third embodiment has a hardware configuration similar to that of the first embodiment (FIGS. 1 and 2), likewise the second embodiment set forth above. The program executed by engine ECU 600 is similar to that of the second embodiment, except for the injection quantity sufficiency determination process (S1100 of FIG. 6). Therefore, detailed description thereof will not be repeated here.

Figure 9:
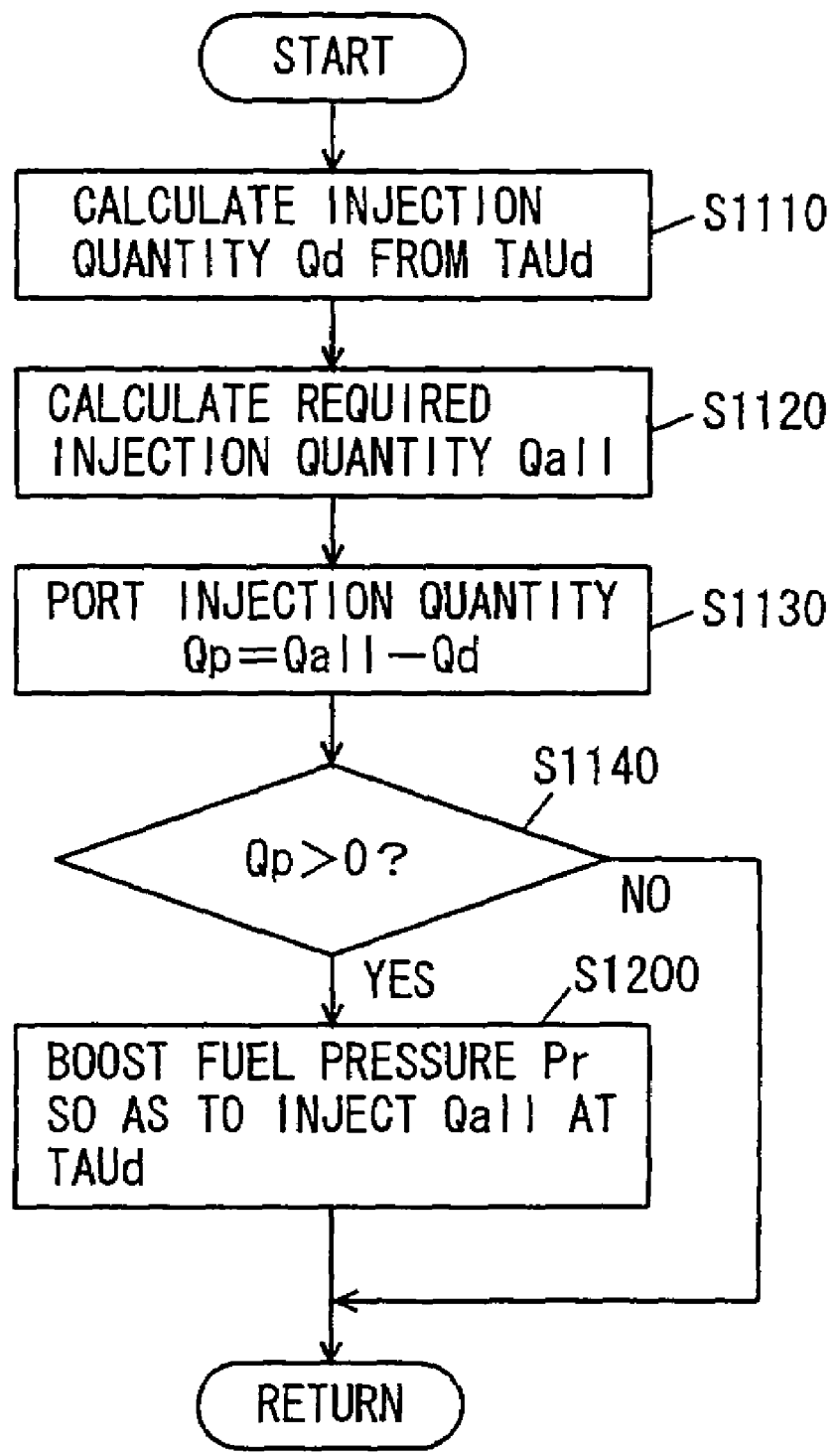
FIG. 9 is a flow chart of a control structure of a program executed by an engine ECU identified as a control apparatus according to a third embodiment of the present invention.

A control structure of a program executed by engine ECU 600 of the third embodiment will be described with reference to FIG. 9. In the flow chart of FIG. 9, procedures identical to those in the process of the flow chart of FIG. 7 have the same step number denoted. Their specific contents are identical. Therefore, detailed descriptions thereof will not be repeated.

At S1200, engine ECU 600 boosts the fuel pressure Pr of the fuel supplied to in-cylinder injector 50 such that the required injection quantity Qall can be injected in the shortened fuel injection period TAUd of in-cylinder injector 50.

Accordingly, in the case where fuel injection period TAU of the in-cylinder injector is reduced to TAUd such that the fuel injection period of the in-cylinder injector does not overlap with the KCS gate, but with insufficient fuel injection quantity from in-cylinder injector 50, the fuel pressure is boosted so that the required injection quantity Qall can be injected in the shortened fuel injection period TAUd.

Fourth Embodiment

A control apparatus for an internal combustion engine according to a fourth embodiment of the present invention will be described hereinafter. The control apparatus for an internal combustion engine of the fourth embodiment has a hardware configuration similar to that of the first embodiment, likewise the second and third embodiments set forth above (FIGS. 1 and 2). Therefore, detailed description thereof will not be repeated here.

The present embodiment is directed to lower the fuel pressure of the high pressure fuel system in order to reduce the vibration caused by the closure of the needle valve of in-cylinder injector 50 and/or the vibration from the high pressure fuel system that supplies fuel to in-cylinder injector 50.

By lowering the fuel pressure, knock sensor 230 is rendered impervious to the vibration in connection with the closure of the needle valve (seating) even if the closing timing of the needle valve at in-cylinder injector 50 is retarded to the vicinity of the compression top dead center and enters the knock control system gate.

Since the level of the vibration is reduced when the fuel pressure is lowered, knock sensor 230 will no longer sense the vibration in connection with the closure of the needle valve (seating). Therefore, even if the closing timing of the needle valve enters the gate, a signal corresponding to the vibration in connection with the closure of the needle valve (seating) will not be output from knock sensor 230. Thus, the noise in connection with the closing valve will not exceed the knock criterion value. An erroneous determination of knocking, though not actually occurring, caused by a false count added due to the output peak value from knock sensor 230 exceeding the determination criterion value to result in the total count becoming greater than the predetermined number of times, can be eliminated.

In addition to the vibration caused by the closure of the needle valve (seating) of in-cylinder injector 50, vibration caused by the opening/closing an electromagnetic spill valve of a high pressure fuel pump, for example, can also be accommodated in a similar manner. Even if noise generated from the high pressure fuel system occurs within the KCS gate, knock sensor 230 is prevented from sensing such vibration since the fuel pressure is lowered to reduce the level of the vibration generated from the high pressure fuel system.

By lowering the fuel pressure as set forth above, the injection period during which fuel is injected from in-cylinder injector 50 TAU is lengthened. In addition to preventing knock sensor 230 from erroneous sensing by lowering the fuel pressure to reduce the level of vibration, measures set forth below can be employed.

The fuel pressure can be lowered to increase the fuel period TAU, and set the end of injection period TAU during which fuel is injected by in-cylinder injector 50 (needle valve closing (seating) timing) outside the KCS gate range. In other words the fuel pressure is lowered such that the termination of the injection period TAU (injection end time Aend) is retarded later than the termination of the KCS gate. Accordingly, such a lower fuel pressure allows the vibration caused by the closure of the needle valve (seating) to be reduced, and the injection period is lengthened corresponding to the lowered fuel pressure to set the termination of the injection period TAU outside the KCS gate.

In the case where the fuel injection quantity by in-cylinder injector 50 is insufficient when the fuel pressure is lowered and/or when the fuel end time is retarded out of the KCS gate, the insufficient fuel is to be injected from intake manifold injector 100.

<Engine (1) to which Present Control Apparatus can be Suitably Applied>

An engine (1) to which the control apparatus of the present embodiment is suitably adapted will be described hereinafter.

Figure 10:
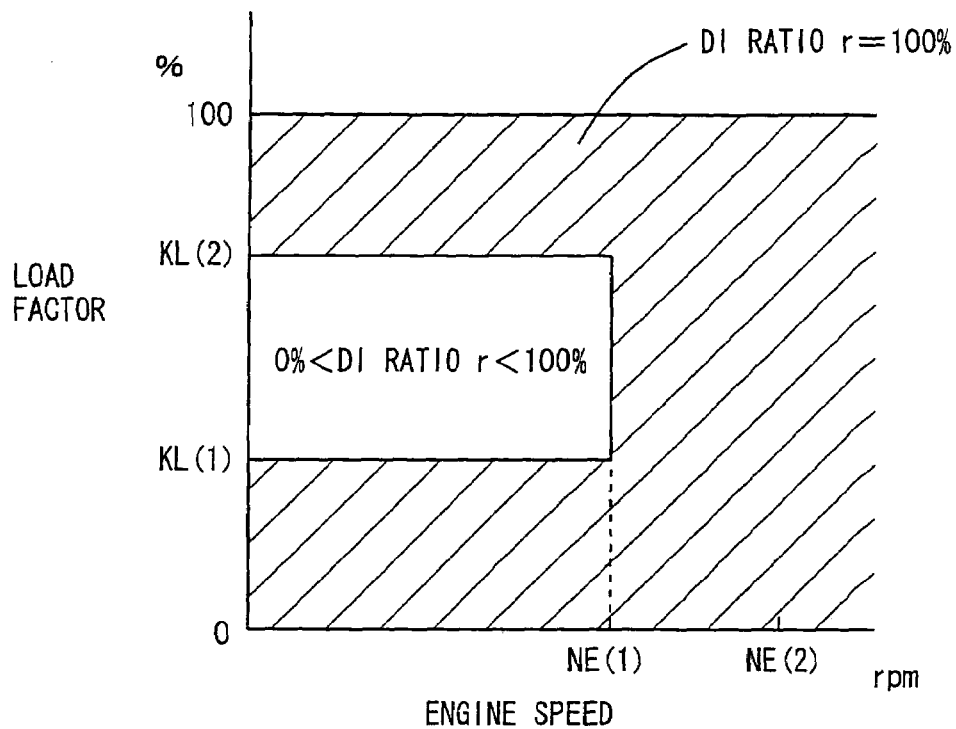
FIG. 10 represents a DI ratio map (part one) corresponding to a warm state of an engine to which the control apparatus of an embodiment of the present invention is suitably adapted.
Figure 11:
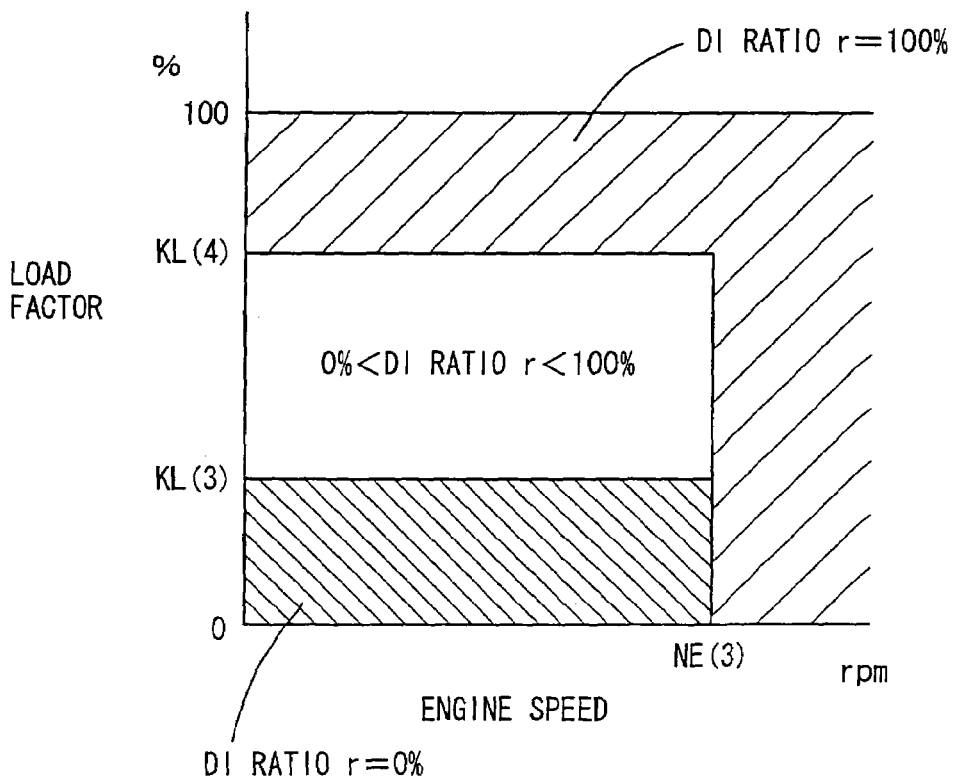
FIG. 11 represents a DI ratio map (part one) corresponding to a cold state of an engine to which the control apparatus of an embodiment of the present invention is suitably adapted.

Referring to FIGS. 10 and 11, maps each indicating a fuel injection ratio between in-cylinder injector 10 and intake manifold injector 120, identified as information associated with an operation state of engine 10, will now be described. Herein, the fuel injection ratio between the two injectors is also expressed as a ratio of the quantity of the fuel injected from in-cylinder injector 10 to the total quantity of the fuel injected, which is referred to as the "fuel injection ratio of in-cylinder injector 110", or a "DI (Direct Injection) ratio (r)". The maps are stored in an ROM of an engine ECU. FIG. 10 is the map for a warm state of engine 10, and FIG. 11 is the map for a cold state of engine 10.

In the maps of FIGS. 10 and 11, the fuel injection ratio of in-cylinder injector 10 is expressed in percentage as the DI ratio r, wherein the engine speed of engine 10 is plotted along the horizontal axis and the load factor is plotted along the vertical axis.

As shown in FIGS. 10 and 11, the DI ratio r is set for each operation region that is determined by the engine speed and the load factor of engine 10. "DI RATIO r=100%" represents the region where fuel injection is carried out from in-cylinder injector 110 alone, and "DI RATIO r=0%" represents the region where fuel injection is carried out from intake manifold injector 120 alone. "DI RATIO r≠0%", "DI RATIO r≠100%" and "0%<DI RATIO r<100%" each represent the region where in-cylinder injector 110 and intake manifold injector 120 partake in fuel injection. Generally, in-cylinder injector 110 contributes to an increase of power performance, whereas intake manifold injector 120 contributes to uniformity of the air-fuel mixture. These two types of injectors having different characteristics are appropriately selected depending on the engine speed and the load factor of engine 10, so that only homogeneous combustion is conducted in the normal operation state of engine 10 (other than the abnormal operation state such as a catalyst warm-up state during idling).

Further, as shown in FIGS. 10 and 11, the DI ratio r of in-cylinder injector 110 and intake manifold injector 120 is defined individually in the maps for the warm state and the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 10 is selected; otherwise, the map for the cold state shown in FIG. 11 is selected. In-cylinder injector 110 and/or intake manifold injector 120 are controlled based on the selected map as well as the engine speed and the load factor of engine 10.

The engine speed and the load factor of engine 10 set in FIGS. 10 and 11 will now be described. In FIG. 10, NE(1) is set to 2500 rpm to 2700 rpm, KL(1) is set to 30% to 50%, and KL(2) is set to 60% to 90%. In FIG. 11, NE(3) is set to 2900 rpm to 3100 rpm. That is, NE(1)<NE(3). NE(2) in FIG. 10 as well as KL(3) and KL(4) in FIG. 11 are also set appropriately.

When comparing FIG. 10 and FIG. 11, NE(3) of the map for the cold state shown in FIG. 11 is greater than NE(1) of the map for the warm state shown in FIG. 10. This shows that, as the temperature of engine 10 becomes lower, the control region of intake manifold injector 120 is expanded to include the region of higher engine speed. That is, in the case where engine 10 is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, whereby homogeneity is improved.

When comparing FIG. 10 and FIG. 11, "DI RATIO r=100%" in the region where the engine speed of engine 10 is NE(1) or higher in the map for the warm state, and in the region where the engine speed is NE(3) or higher in the map for the cold state. In terms of load factor, "DI RATIO r=100%" in the region where the load factor is KL(2) or greater in the map for the warm state, and in the region where the load factor is KL(4) or greater in the map for the cold state. This means that in-cylinder injection 110 alone is used in the region of a predetermined high engine speed, and in the region of a predetermined high engine load. That is, in the high speed region or the high load region, even if fuel injection is carried out through in-cylinder injector 110 alone, the engine speed and the load of engine 10 are so high and the intake air quantity so sufficient that it is readily possible to obtain a homogeneous air-fuel mixture using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, so that the anti-knocking performance is improved. Further, since the temperature within the combustion chamber is decreased, intake efficiency improves, leading to high power.

In the map for the warm state in FIG. 10, fuel injection is also carried out using in-cylinder injector 110 alone when the load factor is KL(1) or less. This shows that in-cylinder injector 110 alone is used in a predetermined low-load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, in which case accumulation of deposits is prevented. Further, clogging of in-cylinder injector 110 may be prevented while ensuring the minimum fuel injection quantity thereof. Thus, in-cylinder injector 110 solely is used in the relevant region.

When comparing FIG. 10 and FIG. 11, the region of "DI RATIO r=0%" is present only in the map for the cold state of FIG. 11. This shows that fuel injection is carried out through intake manifold injector 120 alone in a predetermined low-load region (KL(3) or less) when the temperature of engine 10 is low. When engine 10 is cold and low in load and the intake air quantity is small, the fuel is less susceptible to atomization. In such a region, it is difficult to ensure favorable combustion with the fuel injection from in-cylinder injector 110. Further, particularly in the low-load and low-speed region, high power using in-cylinder injector 110 is unnecessary. Accordingly, fuel injection is carried out through intake manifold injector 120 alone, rather than in-cylinder injector 110, in the relevant region.

Further, in an operation other than the normal operation, or, in the catalyst warm-up state during idling of engine 10 (an abnormal operation state), in-cylinder injector 110 is controlled such that stratified charge combustion is effected. By causing the stratified charge combustion only during the catalyst warm-up operation, warming up of the catalyst is promoted to improve exhaust emission.

<Engine (2) to Which Present Control Apparatus is Suitably Adapted>

An engine (2) to which the control apparatus of the present embodiment is suitably adapted will be described hereinafter. In the following description of the engine (2), the configurations similar to those of the engine (1) will not be repeated.

Figure 12:
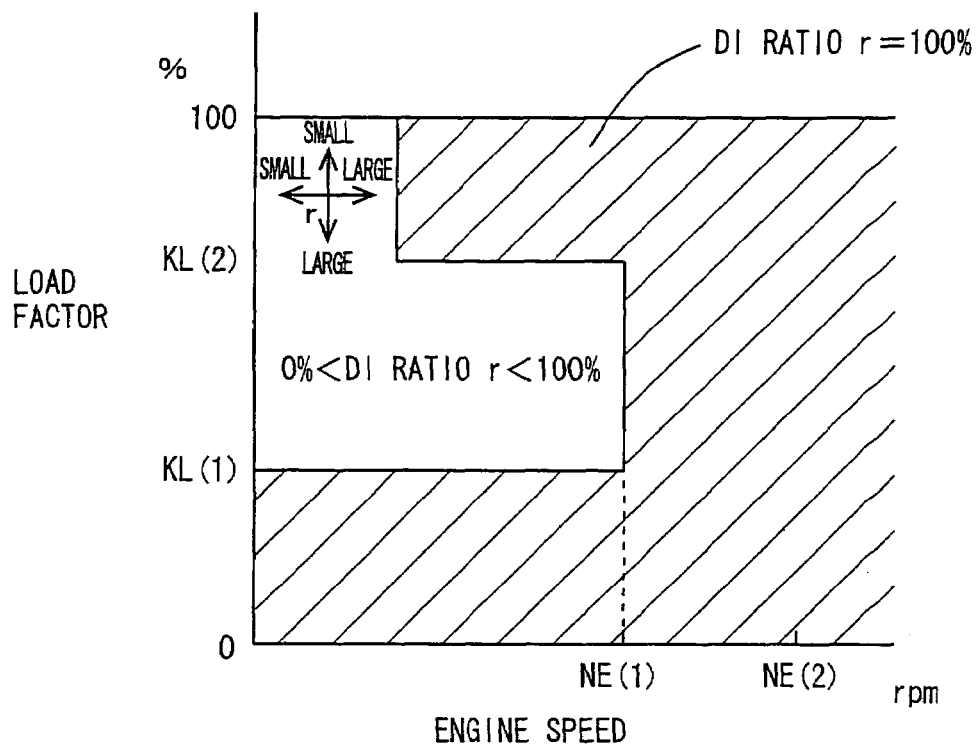
FIG. 12 represents a DI ratio map (part two) corresponding to a warm state of an engine to which the control apparatus of an embodiment of the present invention is suitably adapted.
Figure 13:
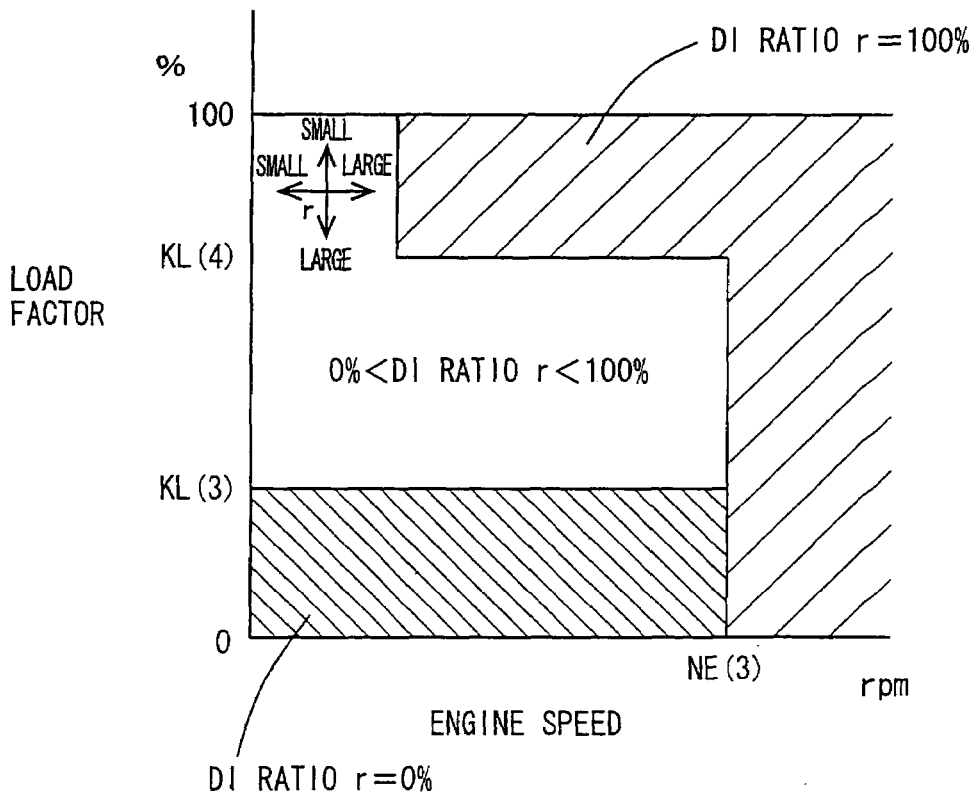
FIG. 13 represents a DI ratio map (part two) corresponding to a cold state of an engine to which the control apparatus of an embodiment of the present invention is suitably adapted.

Referring to FIGS. 12 and 13, maps each indicating the fuel injection ratio between in-cylinder injector 110 and intake manifold injector 120 identified as information associated with the operation state of engine 10 will be described. The maps are stored in an ROM of an engine ECU. FIG. 12 is the map for the warm state of engine 10, and FIG. 13 is the map for the cold state of engine 10.

FIGS. 12 and 13 differ from FIGS. 10 and 11 in the following points. "DI RATIO r=100%" holds in the region where the engine speed of engine 10 is equal to or higher than NE(1) in the map for the warm state, and in the region where the engine speed is NE(3) or higher in the map for the cold state. Further, "DI RATIO r=100%" holds in the region, excluding the low-speed region, where the load factor is KL(2) or greater in the map for the warm state, and in the region, excluding the low-speed region, where the load factor is KL(4) or greater in the map for the cold state. This means that fuel injection is carried out through in-cylinder injector 110 alone in the region where the engine speed is at a predetermined high level, and that fuel injection is often carried out through in-cylinder injector 110 alone in the region where the engine load is at a predetermined high level. However, in the low-speed and high-load region, mixing of an air-fuel mixture produced by the fuel injected from in-cylinder injector 110 is poor, and such inhomogeneous air-fuel mixture within the combustion chamber may lead to unstable combustion. Thus, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the DI ratio r are shown by crisscross arrows in FIGS. 12 and 13. In this manner, variation in output torque of the engine attributable to the unstable combustion can be suppressed. It is noted that these measures are substantially equivalent to the measures to decrease the fuel injection ratio of in-cylinder injector 110 in connection with the state of the engine moving towards the predetermined low speed region, or to increase the fuel injection ratio of in-cylinder injector 10 in connection with the engine state moving towards the predetermined low load region. Further, in a region other than the region set forth above (indicated by the crisscross arrows in FIGS. 12 and 13) and where fuel injection is carried out using only in-cylinder injector 110 (on the high speed side and on the low load side), the air-fuel mixture can be readily set homogeneous even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression end, whereby the antiknock performance is improved. Further, with the decreased temperature of the combustion chamber, intake efficiency improves, leading to high power output.

In engine 10 described in conjunction with FIGS. 10–13, homogeneous combustion is achieved by setting the fuel injection timing of in-cylinder injector 110 in the intake stroke, whereas stratified charge combustion is realized by setting the fuel injection timing of in-cylinder injector 110 in the compression stroke. That is, when the fuel injection timing of in-cylinder injector 110 is set in the compression stroke, a rich air-fuel mixture can be developed locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to develop a rich air-fuel mixture locally around the spark plug.

As used herein, the stratified charge combustion includes both the stratified charge combustion and semi-stratified charge combustion set forth below. In the semi-stratified charge combustion, intake manifold injector 120 injects fuel in the intake stroke to generate a lean and homogeneous air-fuel mixture in the entire combustion chamber, and then in-cylinder injector 110 injects fuel in the compression stroke to generate a rich air-fuel mixture around the spark plug, whereby the combustion state is improved. Such semi-stratified charge combustion is preferable in the catalyst warm-up operation for the following reasons. In the catalyst warm-up operation, it is necessary to considerably retard the ignition timing and maintain a favorable combustion state (idling state) so as to cause a high-temperature combustion gas to reach the catalyst. Further, a certain quantity of fuel must be supplied. If the stratified charge combustion is employed to satisfy these requirements, the quantity of the fuel will be insufficient. If the homogeneous combustion is employed to satisfy these requirements, the retarded amount for the purpose of maintaining favorable combustion is small as compared to that of stratified charge combustion. In view of the foregoing, the above-described semi-stratified charge combustion is preferably employed in the catalyst warm-up operation, although either of stratified charge combustion and semi-stratified charge combustion may be employed.

Further, in the engine described in conjunction with FIGS. 10–13, the fuel injection timing of in-cylinder injector 110 is set in the intake stroke for most of the fundamental regions (here, the fundamental region refers to the region other than the region where semi-stratified charge combustion is carried out with fuel injection from intake manifold injector 120 in the intake stroke and fuel injection from in-cylinder injector 110 in the compression stroke, which is carried out only during the catalyst warm-up state). The fuel injection timing of in-cylinder injector 110, however, may be set temporarily in the compression stroke for the purpose of stabilizing combustion. The reason thereof will be described hereinafter.

When the fuel injection timing of in-cylinder injector 110 is set in the compression stroke, the air-fuel mixture is cooled by the fuel injection while the temperature in the cylinder is relatively high. Accordingly, the cooling effect is enhanced to improve the antiknock performance. Further, when the fuel injection timing of in-cylinder injector 110 is set in the compression stroke, the time required from the fuel injection to the ignition is short, which ensures strong penetration of the injected fuel. Therefore, the combustion rate is increased. The improvement in antiknock performance and the increase in combustion rate can prevent variation in combustion, and thus, combustion stability is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine including a first fuel injection mechanism for injecting fuel into a cylinder, and a second fuel injection mechanism for injecting fuel into an intake manifold, operating the fuel injection mechanism based on a fuel injection timing and fuel injection period, and carrying out knock determination based on an output signal from a knock sensor in a knock determination period, said control apparatus comprising:
   a determination unit for determining whether a noise generated by an operation of said first fuel injection mechanism overlaps with an output signal from said knock sensor in said knock determination period,
   a modification unit for modifying at least one of the fuel injection timing and fuel injection period of said first fuel injection mechanism so as to avoid an event of the noise generated by an operation of said first fuel injection mechanism overlapping with the output signal of said knock sensor in said knock determination period, based on a determination result from said determination unit, and
   a control unit for controlling said second fuel injection mechanism so as to compensate for insufficiency when a required fuel injection quantity will be insufficient under a modified fuel injection state.

2. The control apparatus for an internal combustion engine according to claim 1, wherein said modification unit conducts modification so as to shorten the fuel injection period,
   said control apparatus further comprising a fuel pressure control unit controlling a fuel pressure such that said required fuel injection quantity can be supplied at the modified fuel injection period.

3. The control apparatus for an internal combustion engine according to claim 1, wherein said first fuel injection mechanism includes an in-cylinder injector, and said second fuel injection mechanism includes an intake manifold injector.

4. A control apparatus for an internal combustion engine including a first fuel injection mechanism for injecting fuel into a cylinder, and a second fuel injection mechanism for injecting fuel into an intake manifold, operating the fuel injection mechanism based on a fuel injection timing and fuel injection period, and carrying out knock determination based on an output signal from a knock sensor in a knock determination period, said control apparatus comprising:
   a determination unit for determining whether a noise generated by at least one of an operation of said first fuel injection mechanism and an operation of a high pressure fuel system that supplies fuel to said first fuel injection mechanism overlaps with an output signal from said knock sensor in said knock determination period,
   a modification unit for modifying a fuel pressure of said high pressure fuel system so as to avoid an event of the noise generated by said operation overlapping with the output signal of said knock sensor in said knock determination period, based on a determination result from said determination unit, and
   a control unit for controlling said second fuel injection mechanism so as to compensate for insufficiency when a required fuel injection quantity will be insufficient under a modified fuel pressure.

5. The control apparatus for an internal combustion engine according to claim 4, wherein said modification unit conducts modification so as to lower said fuel pressure,
   said control apparatus further comprising an injection period control unit controlling the fuel injection period such that said required fuel injection quantity can be supplied at the lowered fuel pressure.

6. The control apparatus for an internal combustion engine according to claim 5, wherein said injection period control unit effects control so as to increase said fuel injection period and set the end of said fuel injection period to become later than the end of said knock determination period.

7. A control apparatus for an internal combustion engine including first fuel injection means for injecting fuel into a cylinder, and second fuel injection means for injecting fuel into an intake manifold, operating the fuel injection means based on a fuel injection timing and fuel injection period, and carrying out knock determination based on an output signal from a knock sensor in a knock determination period, said control apparatus comprising:
   determination means for determining whether a noise generated by an operation of said first fuel injection means overlaps with an output signal from said knock sensor in said knock determination period,
   modify means for modifying at least one of the fuel injection timing and fuel injection period of said first fuel injection means so as to avoid an event of the noise generated by an operation of said first fuel injection means overlapping with the output signal of said knock sensor in said knock determination period, based on a determination result from said determination means, and
   control means for controlling said second fuel injection means so as to compensate for insufficiency when a required fuel injection quantity will be insufficient under a modified fuel injection state.

8. The control apparatus for an internal combustion engine according to claim 7, wherein said modify means conducts modification so as to shorten the fuel injection period,
   said control apparatus further comprising means for controlling a fuel pressure such that said required fuel injection quantity can be supplied at the modified fuel injection period.

9. The control apparatus for an internal combustion engine according to claim 7, wherein said first fuel injection means includes an in-cylinder injector, and said second fuel injection means includes an intake manifold injector.

10. A control apparatus for an internal combustion engine including first fuel injection means for injecting fuel into a cylinder, and second fuel injection means for injecting fuel into an intake manifold, operating the fuel injection means based on a fuel injection timing and fuel injection period, and carrying out knock determination based on an output signal from a knock sensor in a knock determination period, said control apparatus comprising:

determination means for determining whether a noise generated by at least one of an operation of said first fuel injection means and an operation of a high pressure fuel system that supplies fuel to said first fuel injection means overlaps with an output signal from said knock sensor in said knock determination period, modify means for modifying a fuel pressure of said high pressure fuel system so as to avoid an event of the noise generated by said operation overlapping with the output signal of said knock sensor in said knock determination period, based on a determination result from said determination means, and control means for controlling said second fuel injection means so as to compensate for insufficiency when a required fuel injection quantity will be insufficient under a modified fuel pressure.

11. The control apparatus for an internal combustion engine according to claim 10, wherein said modify means conducts modification so as to lower said fuel pressure, said control apparatus further comprising injection period control means for controlling the fuel injection period such that said required fuel injection quantity can be supplied at the lowered fuel pressure.

12. The control apparatus for an internal combustion engine according to claim 11, wherein said injection period control means includes means for effecting control so as to increase said fuel injection period and set the end of said fuel injection period to become later than the end of said knock determination period.

* * * * *